United States Patent [19]

Uyama et al.

[11] Patent Number: 4,846,047
[45] Date of Patent: Jul. 11, 1989

[54] BRAKE BOOSTER WITH SEAL HOUSING AND KEY MEMBER

[75] Inventors: Shintaro Uyama; Ryuji Ohta; Yoshimichi Inoue, all of Saitama, Japan

[73] Assignee: Jidosha Kiki Co., Ltd., Tokyo, Japan

[21] Appl. No.: 151,409

[22] Filed: Feb. 2, 1988

[30] Foreign Application Priority Data

Feb. 12, 1987 [JP] Japan ................................ 62-19365

[51] Int. Cl.⁴ .............................................. F15B 9/10
[52] U.S. Cl. ................................. 91/369.4; 91/376 R; 92/169.1
[58] Field of Search ............. 91/369 R, 369 C, 376 R; 92/169.1, 169.2, 169.3, 169.4

[56] References Cited

U.S. PATENT DOCUMENTS

| | | | |
|---|---|---|---|
| 2,897,789 | 8/1959 | Rosback | 91/376 R |
| 4,397,219 | 8/1983 | Belart | 91/376 R |
| 4,469,009 | 9/1984 | Takayama et al. | 91/369 C X |
| 4,472,997 | 3/1982 | Ohmi . | |
| 4,487,105 | 12/1984 | Harrison | 91/376 R X |
| 4,587,885 | 5/1986 | Boehm et al. | 91/376 R |
| 4,598,624 | 7/1986 | Wagner | 91/376 R X |
| 4,643,076 | 9/1985 | Satoh . | |

FOREIGN PATENT DOCUMENTS

| | | |
|---|---|---|
| 1505664 | 9/1970 | Fed. Rep. of Germany .... 91/376 R |
| 107945 | 7/1982 | Japan ................................ 91/369 C |
| 57198158 | 12/1984 | Japan . |
| 2065809 | 7/1981 | United Kingdom . |
| 2064690 | 6/1983 | United Kingdom . |

Primary Examiner—Robert E. Garrett
Assistant Examiner—M. Williamson
Attorney, Agent, or Firm—Flynn, Thiel, Boutell & Tanis

[57] ABSTRACT

A brake booster is disclosed which reduces an idle stroke of an input shaft, by bringing a key member which is mechanically coupled to a valve plunger into abutment against an inner wall surface of a shell when the brake booster is inoperative. The shell includes a cylindrical projection which extends rearwardly from the center thereof, and the cylindrical projection is formed with a flange which extends radially inward, with its inner periphery cut away to define an opening. A valve body includes a cylindrical portion which extends through the opening to the outside thereof. By disposing the key member for abutment against the inner wall surface of the flange, a reduction in the length of the key member is enabled. A seal member seals the cylindrical portion of the valve body, and is located rearwardly of the flange and is received within a housing which is disposed outside the shell.

7 Claims, 2 Drawing Sheets

BRAKE BOOSTER WITH SEAL HOUSING AND KEY MEMBER

FIELD OF THE INVENTION

The invention relates to a brake booster, and more particularly, to a brake booster in which when the booster is inoperative, a key member which is mechanically coupled to a valve plunger is brought into abutment against an inner wall surface of a shell, for example, to limit a free retracting movement of the valve plunger and its interlocked input shaft in order to reduce an idle stroke of the input shaft when a braking action is applied next.

DESCRIPTION OF THE PRIOR ART

A brake booster is known in the art comprising a valve body slidably disposed within a shell, a valve mechanism received within the valve body, an input shaft mechanically coupled to a valve plunger, which forms part of the valve mechanism, to switch a fluid path within the valve mechanism, and a key member mechanically coupled to the plunger, with an arrangement such that when the brake booster is inoperative, the key member is brought into abutment against an inner wall surface of a shell, usually the internal surface of a portion which represents a mounting surface for mounting the shell onto a car body, to limit a free retracting movement of the valve plunger so that an idle stroke of the input shaft is reduced when the braking action is applied next.

A brake booster generally includes a cylindrical projection extending from the center of a rear portion of the shell with an opening therein. A cylindrical rear portion of the valve body slidably extends through the cylindrical projection to the outside thereof, and a seal member is disposed inside the projection so as to maintain a hermetic seal with respect to the cylindrical portion of the valve body.

At a location rearward of the mounting surface mentioned above where the shell is mounted onto the car body, the cylindrical projection is formed with a radially inwardly extending step with a reduced diameter, against the inner surface of which the key member is brought into abutment with an attempt to establish a stop postiion for the key member or the valve body when the brake booster is inoperative which is located rearward of a corresponding stop position in a more common brake booster, thus enabling a reduction in the axial length of the brake booster as measured in the forward direction when referenced to the mounting surface. (See Japanese Laid-Open Patent Application No. 198,158/1982).

However, in any construction of conventional brake booster of the type described immediately above, a seal member is located around the cylindrical portion of the valve body, and is surrounded in turn by the cylindrical projection so as to be held thereby. The abutting surface for the key member is disposed on the outer periphery of the cylindrical projection.

As a consequence, it is necessary to provide a space for the provision of the seal member between the abutting surface of the key member and the outer peripheral surface of the valve body. This increases the required length of the key member, which also requires an increased thickness in order to secure the strength thereof, thus causing an increase in the weight and the axial length of the brake booster.

SUMMARY OF THE INVENTION

In view of the foregoing, in accordance with the invention, the cylindrical projection of the shell is formed with a radially inwardly extending flange, with its internal periphery cut away to define the opening. The key member is arranged for abutment against the inner wall surface of the flange to limit a free retracting movement of the valve plunger. The seal member mentioned above is disposed outside the flange so as to be received within a housing which is located outside the shell.

With this construction, the inner peripheral edge of the flange may be brought close to the external peripheral surface of the cylindrical portion of the valve body, thus permitting a reduction in the length of the key member as compared with the prior art. This contributes to reducing the weight and the thickness of the key member and also a reduction in the weight and the axial length of the brake booster.

The housing which is disposed outside the shell is not subject to any substantial fluid pressure in contrast to the shell, and hence may have a reduced wall thickness as compared with the shell, again contributing to a reduction in the weight of the brake booster.

Above and other objects, features and advantages of the invention will become apparent from the following description of an embodiment thereof with reference to the drawings.

DETAILED DESCRIPTION OF EMBODIMENT

Figures 1, 1A:
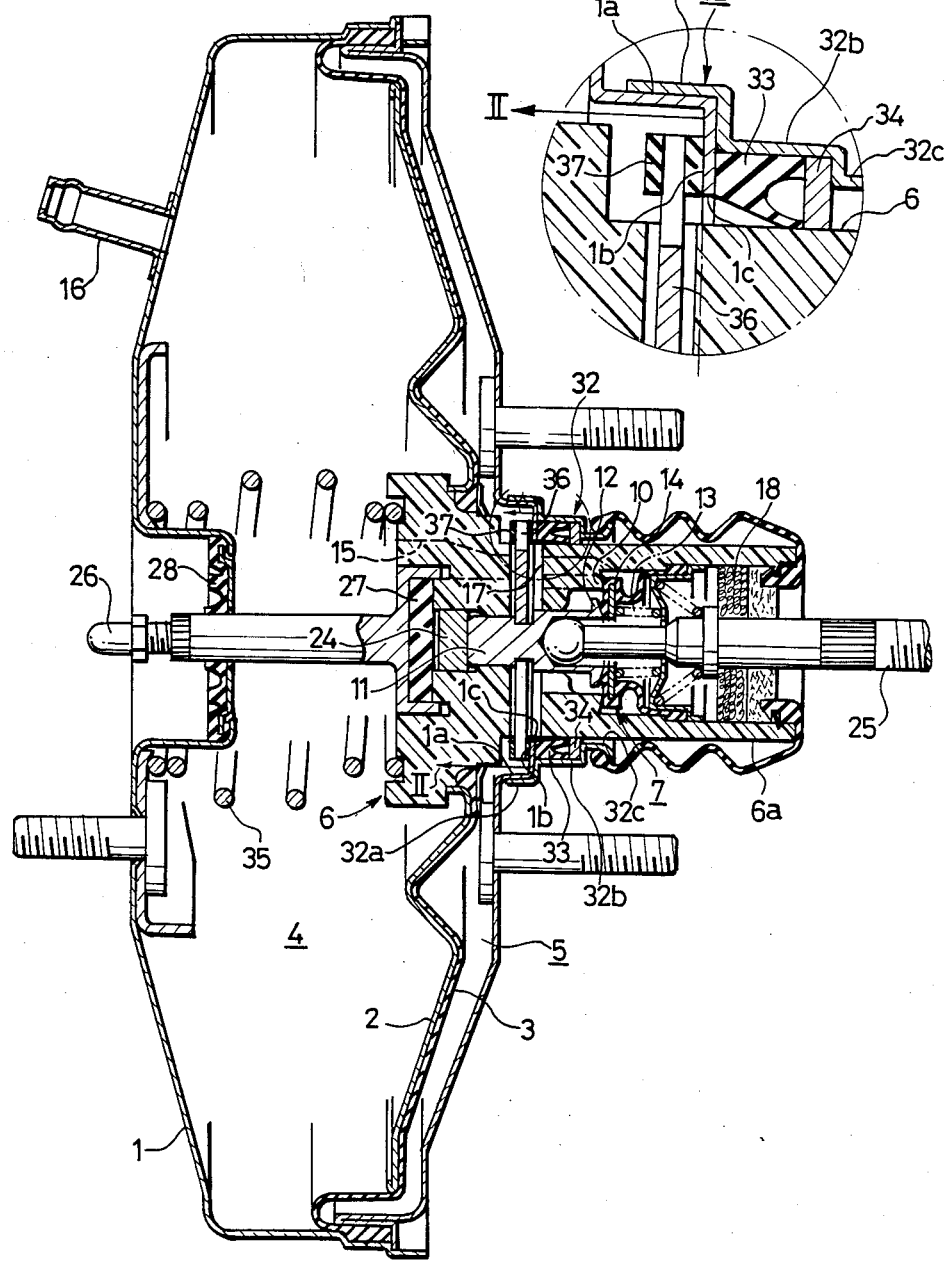
FIG. 1 is a longitudinal section of one embodiment of the invention.
FIG. 1a is an enlarged fragment of FIG. 1.

Referring to the drawings, an embodiment of the invention will be described. Initially referring to FIG. 1, the brake booster includes a shell 1 in which a power piston 2 is slidably disposed. A diaphragm 3 is applied to the back surface of the power piston 2, and the combination of the power piston 2 and the diaphragm 3 divides the interior of the shell 1 into a forwardly located, constant pressure chamber 4 and a rearwardly located, variable pressure chamber 5. An axial portion of the power piston 2 is integrally formed with a valve body 6 in which a valve mechanism 7 operating to switch a fluid path is received.

The valve mechanism 7 comprises a first valve seat 10 formed on the valve body 6, a second valve seat 12 formed on a valve plunger 11, and a valve element 14 adapted to be seated upon either valve seat 10 or 12 from the rear side of the power piston 2, or from the right-hand side, as viewed in FIG. 1, under the resilience of a spring 13. A region disposed outside a seal defined by the first valve seat 10 and the valve element 14 communicates with the constant pressure chamber 4 through a passage 15 formed in the valve body 6. The chamber 4 communicates with a source of negative pressure such as an intake manifold of an engine through a piping 16 mounted on the shell 1 which is effective to introduce a negative pressure.

On the other hand, a region located intermediate the seal defined between the first valve seat 10 and the valve element 14 and another seal defined between the second valve seat 12 and the valve element 14 communicates with the variable pressure chamber 5 through a passage 17 formed in the valve body 6. A region disposed inside the seal defined between the second valve seat 12 and the valve element 14 communicates with the atmosphere through a filter 18.

The valve plunger 11, which forms the valve mechanism 7, is connected to an input shaft 25 which is mechanically coupled to a brake pedal, not shown. A plate 24 is disposed on the front end of the valve plunger 11, and its front surface is disposed in opposing relationship with a reaction disc 27 received in a recess formed in the proximate end of an output shaft 26, which extends through a seal member 28 to project externally of the shell 1 for connection with a piston of a master cylinder, not shown.

In its rear portion, the shell 1 is centrally formed with a cylindrical projection 1a which extends axially rearward, with a flange 1b extending radially inward from the end thereof. An opening 1c is stamped through the inner periphery of the flange 1b. The valve body 6 is formed with a cylindrical portion 6a in its rear region, which slidably extends through the opening 1c to the outside.

A substantially cylindrical housing 32 is mounted on the cylindrical projection 1a on the rear side thereof. The housing 32 includes a first portion 32a of an increased diameter, a second portion 32b of a medium diameter and a third portion 32c of a reduced diameter, as viewed sequentially from the left. The cylindrical projection 1a is fitted into the first housing portion 32a to abut against the step defined between the housing portions 32a and 32b, and if required, the housing portions may be crimped, thus mounting the housing 32 on the cylindrical projection 1a.

A step defined between the second and the third portion 32b, 32c of the housing 32 has its inner wall surface disposed in opposing relationship with the outer wall surface of the flange 1b. Disposed within the housing portion 32b between there wall surfaces are a seal member 33 which is disposed in sliding contact with the cylindrical portion 6a of the valve body 6 to maintain the opening 1c hermetically sealed, and a bearing 34 which is also disposed in sliding contact with the cylindrical portion 6a in order to support it, the seal member and the bearing being sequentially disposed as viewed from the front side toward the rear side.

The power piston 2 and the valve body 6 are normally maintained in their inoperative positions by a return spring 35. In such inoperative position, a key member 36 which is effective to prevent the withdrawal of the valve plunger 11 from the valve body 6 is brought into abutment against the inner wall surface of the flange 1b to limit a free movement to the right of the valve plunger 11 with respect to the valve body 6 so that when the input shaft 25 and the valve plunger 11 are actuated for the next time, a switching of the fluid circuit by the valve mechanism 7 takes place immediately.

Elastic materials 37 such as rubber are applied to the opposite ends of the key member 36, thus preventing the occurrence of sounds of percussion by causing the key member 36 to abut against the inner wall surface of the flange 1b through the interposed elastic materials 37.

Figure 2:
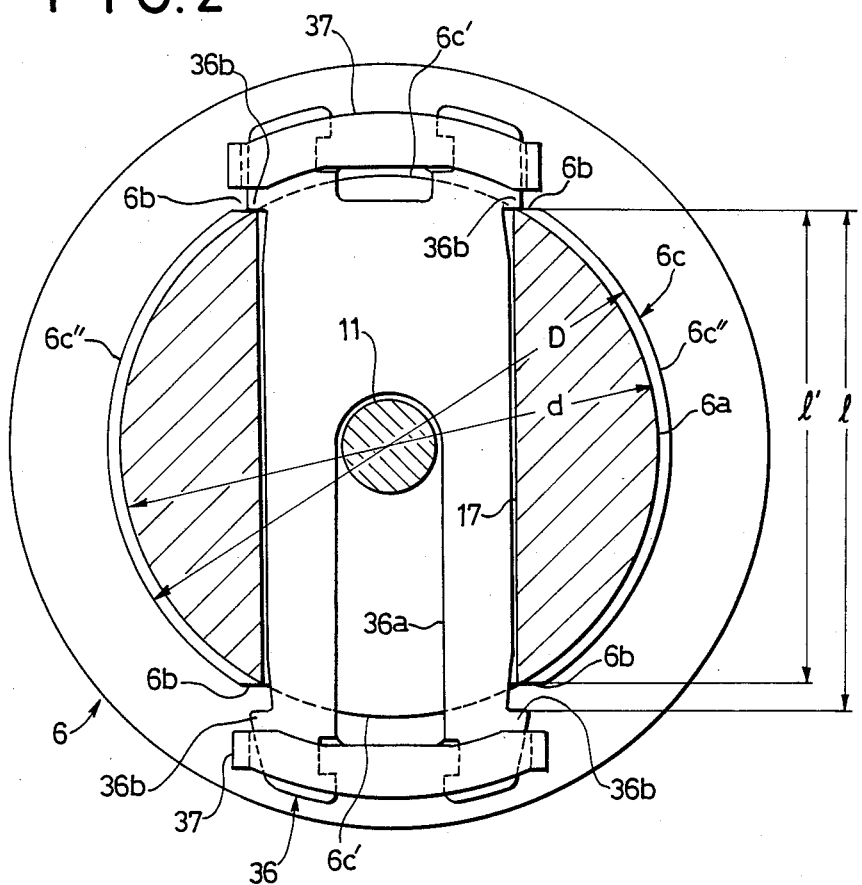
FIG. 2 is a cross section taken along the line II—II shown in FIG. 1.

As shown in FIG. 2, the key member 36 is generally in the form of an elongate rectangle, and is inserted into the passage 27 which is diametrically formed in the valve body 6. A slit 36a is formed in the key member 36 extending from its center to one side lengthwise, and is engaged with a portion of the valve plunger 11 which has a reduced diameter, thus preventing the valve plunger 11 from being withdrawn from the valve body 6.

At each end of the longer side on the opposite sides, the key member 36 is formed with an ear 36b which extends in a direction perpendicular to the longer side to engage the valve body 6 in the region of the opening of the passage 17. When inserting the key member 36 into the passage 17, the spacing between one pair of ears 36b which are located nearer the opening of the slit 36a is reduced to permit the key member 36 to be inserted into the passage 17 and displaced therein until the pair of ears 36b move past the passage 17, whereupon these ears are allowed to spread apart under its own resilience, thus permitting the individual ears 36b to be engaged with the valve body 6. In this manner, the withdrawal of the key member 36 from the valve body 6 is prevented.

The valve body 6 is formed with flats 6b at locations where it is engaged by the ears 36b. By forming the flats 6b on the valve body 6, it is possible to determine the dimension l' on the valve body 6 which can be engaged by the ears 36b accurately with respect to the dimension l measured across the ears 36b located on one longer side of the key member 36, as shown in FIG. 2.

Figure 3:
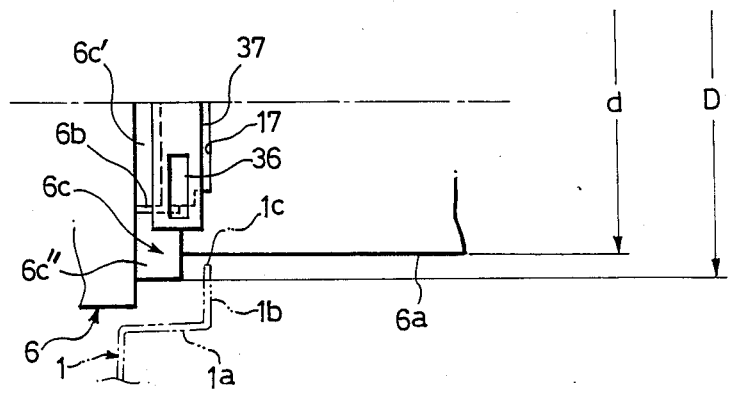
FIG. 3 is a plan view of part of the arrangement shown in FIG. 2.

It will be seen from FIGS. 2 and 3 that the flats 6b continue from the cylindrical portion 6a to a portion 6c of a greater diameter which is located on the front side of the cylindrical portion 6a. As shown in FIG. 2, the portion 6c has the same diameter d as the diameter of the cylindrical portion 6a for an area 6c' corresponding to the opening of the passage 17, and has a diameter D greater than the diameter d of the cylindrical portion 6a for an area 6c'' other than the opening area 6c', and the flat 6b is defined in the junction between the both areas 6c' and 6c''. As shown in FIG. 3, the passage 17 opens over both the cylindrical portion 6a and the greater portion 6c, thus facilitating manufacture of the valve body 6 even though the flats 6b are formed.

Thus, the valve body 6 is formed so that its front portion is generally of a greater diameter than the rear portion, and is usually formed of synthetic resin, and is axially drawn toward the front side from the mold. On the other hand, the diametrically extending passage 17 is formed by inserting a single sliding die radially into the mold. After injecting synthetic resin into the mold, the sliding die is initially drawn to form the passage 17, whereupon the valve body 16 is drawn from the mold with its front side first.

In the manufacturing process of the valve body 6 described, where the flats 6b are formed on the cylindrical portion 6a without utilizing the greater portion 6c, it is necessary that the mold or the sliding die be formed with portions corresponding to these flats.

If the portions corresponding to the flats are formed in them mold, a portion which is located opposite from the direction of insertion of the sliding die will extend radially inward beyond the outer peripheral surface of the cylindrical portion 6a of the valve body 6, making it impossible to draw the valve body 6 from the mold, with its front side drawn first. Accordingly, it becomes necessary to divide the mold into two parts.

On the other hand, if portions corresponding to the flats are formed on the sliding die, such portions corresponding to the flats project to the opposite sides lengthwise of the sliding die and must be formed so as to hold the valve body 6 sandwiched therebetween, Accordingly, if all these portions corresponding to the flats are formed on a single sliding die, its drawing becomes impossible. Again it becomes necessary to divide the sliding die into two parts.

By contrast, when the portion 6c of a greater diameter continues from the cylindrical portion 6a of the valve body 6 on the front side thereof in the manner mentioned above, and when the flats 6b are formed as described, any portion of the mold which corresponds to the flat cannot extend inward beyond the outer peripheral surface of the cylindrical portion 6a, and hence a drawing of the valve body 6 from the mold from its front side is possible.

In the arrangement described above, when a brake pedal, not shown, is depressed to move the input shaft 25 and the valve plunger 11 to the left, the valve element 14 will be seated upon the first valve seat 10 on the valve body 6 to interrupt a communication between the variable pressure chamber 5 and the constant pressure chamber 4 while the second valve seat 12 on the valve plunger 11 will move away from the valve element 14 to establish a communication between the atmosphere and the variable pressure chamber 5. This supplies the atmosphere into the variable pressure chamber 5, whereby a pressure differential across the power piston 2 is effective to move the power piston 2 forward against the resilience of the return spring 35 to provide a braking action, generally in the similar manner as in a conventional brake booster.

If the brake pedal is now released, the valve element 14 will be seated upon the second valve seat 12 on the valve plunger 11 to interrupt the communication between the variable pressure chamber 5 and the atmosphere while the valve element 14 moves away from the first valve seat 10 to re-establish a communication between the variable pressure chamber 5 and the constant pressure chamber 4, thus allowing the power piston 2 to be returned to its original inoperative condition under the resilience of the return spring 35.

When the key member 36 abuts against the inner wall surface of the flange 1b during the retracting movement of the power piston 2, the valve plunger 11 which is mechanically coupled therewith ceases to retract while the power piston 2 and the valve body 6 continue to retract until the first valve seat 10 on the valve body 6 moves close to the valve element 14 to reduce the clearance therebetween to substantially zero as a result of the retracting movement of the valve body 6, whereupon the valve body 6 abuts against the key member 36 to stop its movement. Alternatively, where the valve body 6 is capable of continuing a further retracting movement without involving an abutment of the valve body 6 against the key member 36, the second valve seat 12 will be opened to admit the atmosphere into the variable pressure chamber 5, whereby the power piston 2 moves forward slightly and the power piston 2 comes to a stop with both the first and the second valve seat closed. Accordingly, when the input shaft 25 is driven forward for the next time, a fluid path within the valve mechanism 7 will be switched immediately.

Since the inner peripheral edge of the opening 1c of the flange 1b can be disposed very close to the outer peripheral surface of the cylindrical portion 6a of the valve body 6, the length of the key member 36 which is adapted to abut against the inner wall surface of the flange 1b can be reduced, thus allowing a reduction in the weight and the thickness of the key member to contribute to reducing the weight and the axial length of the brake booster.

The housing 32 which is diposed outside the shell 1 is not subject to any substantial fluid pressure as the shell is, and accordingly may have a reduced wall thickness as compared with the shell 1. Accordingly, a further reduction in the weight of the brake booster is made possible as compared with a conventional arrangement in which the housing is formed of the same material as the shell and integrally therewith.

In addition, the seal member 33 is brought into abutment against the outer wall surface of the flange 1b, and is subject to the atmospheric pressure when the negative pressure is introduced into the variable pressure chamber 5. This maintains the seal member held abutting against the outer wall surface of the flange 1 to improve the reliability of the hermetic seal. An effective sealing effect can be maintained over a prolonged period of time despite an aging effect of the seal.

Alternatively, the elastic materials 37 may be mounted on the flange 1b of the shell 1. To enhance the sealing effect, a seal held between the shell 1 and the housing 32 may be defined around the seal member 33.

As a further alternative, part of the bearing 34 may be skewed and formed of a flexible material, for example, a synthetic resin such as PTFE, PBT, PET or nylon, thus allowing a replacement of the bearing 34. The position of the seal member 33 and the bearings 34 may be interchanged. Also the seal member 33 may be constructed to provide a bearing effect so as to dispense with the bearing 34.

While the invention has been shown and described above in connection with a preferred embodiment thereof, it should be understood that a number of changes, modifications and substitutions therein will readily occur to the one skilled in the art without departing from the spirit and scope of the invention defined by the appended claims.

What is claimed is:

1. A brake booster comprising a shell, a cylindrical projection which extends rearwardly from the center of the shell in its rear portion, said cylindrical projection defining an opening, a valve body slidably disposed within the shell and including a rear cylindrical portion which slidably extends through the cylindrical projection to extend externally thereof, a seal member disposed adjacent the cylindrical projection of the shell, a valve mechanism received within the valve body, an input shaft mechanically coupled to a valve plunger, which forms part of the valve mechanism, for switching a fluid path within the valve mechanism, and a key member mechanically coupled to the valve plunger for limiting a free retracting movement of the valve plunger when the booster is inoperative, thereby reducing an idle stroke of the input shaft;

wherein the cylindrical projection of the shell is formed with a flange which extends radially inward and which has its inner periphery cut away to define the opening, the key member being disposed inside said cylindrical projection of said shell for abutment against the inner wall surface of the flange to limit the free retracting movement of the valve plunger, a housing located outside the shell, the seal member being disposed outside the flange and received within said housing located outside the shell.

2. A brake booster according to claim 1, further including a bearing disposed within the housing for slidably supporting the cylindrical portion of the valve body.

3. A brake booster according to claim 1 in which the seal member is in abutment against the outer wall surface of the flange.

4. The brake booster according to claim 1 in which the housing includes a first portion of an increased diameter which is fitted around the cylindrical projection of the shell, and a second portion of a medium diameter and a third portion of a reduced diameter which are sequentially contiguous to the first portion, said first through third portions extending rearward successively, the seal member being disposed between the outer surface of the flange and the end face of a step defined between the second and the third portion of the housing.

5. A brake booster according to claim 4 in which said seal member is entirely axially contained between said flange and said step defined between said second and third portions of the housing, said key member and seal member being axially separated by said flange and axially spaced by a distance corresponding generally to the thickness of said flange so as to minimize the axial length of the booster, the outer radial extent of said key member and seal member being substantially the same.

6. A brake booster according to claim 1 in which the key member comprises a forked member having a slit formed centrally therein, the key member being inserted into a bore formed to extend radially through the valve body with the extremities located nearer the slit being placed first so that the slit engages a portion of the valve plunger which has a reduced diameter, the extremities of the forked member being formed with ears which are passed through the bore to the outside thereof where they engage the valve body around the opening, thus preventing the withdrawal of the key member from the valve body.

7. A brake booster according to claim 6 in which the cylindrical portion of the valve body includes another portion of a greater diameter on its front side, at least part of the bore through which the key member extends opens into said portion of a greater diameter, said portion of a greater diameter being formed with flats which are located externally of the external diameter of the cylindrical portion and which are engaged by the ears on the key member.

* * * * *

UNITED STATES PATENT AND TRADEMARK OFFICE
CERTIFICATE OF CORRECTION

PATENT NO. : 4 846 047

DATED : July 11, 1989

INVENTOR(S) : Shintaro UYAMA et al.

It is certified that error appears in the above-identified patent and that said Letters Patent is hereby corrected as shown below:

Col. 7, line 18; change "outer surface of" to ---outer wall surface of---.

Signed and Sealed this

Fourteenth Day of August, 1990

Attest:

HARRY F. MANBECK, JR.

Attesting Officer

Commissioner of Patents and Trademarks